(12) United States Patent
Köhler et al.

(10) Patent No.: US 9,868,817 B2
(45) Date of Patent: Jan. 16, 2018

(54) POLYCARBONATE COMPOSITION HAVING IMPROVED OPTICAL AND THERMAL PROPERTIES

(75) Inventors: Karl-Heinz Köhler, Aachen-Brand (DE); Franky Bruynseels, Sint Gillis-Waas (BE)

(73) Assignee: Covestro Deutschland AG (DE)

( * ) Notice: Subject to any disclaimer, the term of this patent is extended or adjusted under 35 U.S.C. 154(b) by 695 days.

(21) Appl. No.: 13/640,985

(22) PCT Filed: Apr. 8, 2011

(86) PCT No.: PCT/EP2011/055479
§ 371 (c)(1),
(2), (4) Date: Dec. 20, 2012

(87) PCT Pub. No.: WO2011/128254
PCT Pub. Date: Oct. 20, 2011

(65) Prior Publication Data
US 2013/0123423 A1    May 16, 2013

(30) Foreign Application Priority Data
Apr. 13, 2010 (DE) .................... 10 2010 014 726

(51) Int. Cl.
*C08G 64/06* (2006.01)
*C08G 64/24* (2006.01)
*C08L 69/00* (2006.01)

(52) U.S. Cl.
CPC ............. *C08G 64/06* (2013.01); *C08G 64/24* (2013.01); *C08L 69/00* (2013.01)

(58) Field of Classification Search
CPC .................................................. C08G 64/06
See application file for complete search history.

(56) References Cited

U.S. PATENT DOCUMENTS

| | | | |
|---|---|---|---|
| 4,904,717 A | 2/1990 | Ho et al. | |
| 4,982,014 A * | 1/1991 | Freitag et al. | 568/721 |
| 5,126,428 A | 6/1992 | Freitag et al. | |
| 5,627,256 A | 5/1997 | Meier et al. | |
| 5,698,600 A | 12/1997 | Wulff et al. | |
| 5,852,138 A | 12/1998 | Meier et al. | |
| 6,673,975 B1 | 1/2004 | Yao et al. | |
| 2003/0055200 A1* | 3/2003 | Ando et al. | 528/196 |
| 2004/0166283 A1 | 8/2004 | Bodiger et al. | |
| 2005/0165258 A1* | 7/2005 | Yao et al. | 568/725 |
| 2005/0215833 A1 | 9/2005 | Neumann et al. | |
| 2009/0093583 A1 | 4/2009 | Kawato et al. | |

FOREIGN PATENT DOCUMENTS

| | | |
|---|---|---|
| DE | 3832396 A1 | 2/1990 |
| EP | 0359953 B1 | 1/1992 |
| EP | 718354 B1 | 4/1999 |
| EP | 0770589 B1 | 1/2001 |
| EP | 789053 B1 | 10/2001 |
| EP | 1240240 B1 | 4/2006 |
| FR | 1561518 A | 3/1969 |
| GB | 1229482 A | 4/1971 |
| JP | 2004217734 A | 8/2004 |
| JP | 2005023124 A | 1/2005 |
| JP | 2005060540 A | 3/2005 |
| JP | 2006028391 A | 2/2006 |
| JP | 2008111047 A | 5/2008 |
| WO | WO-99/55772 A1 | 11/1999 |
| WO | WO-2007004434 A1 | 1/2007 |

OTHER PUBLICATIONS

International Search Report for PCT/EP2011/055479 dated Jul. 22, 2011.

* cited by examiner

*Primary Examiner* — Michael Pepitone
(74) *Attorney, Agent, or Firm* — Drinker Biddle & Reath LLP

(57) ABSTRACT

The invention relates to aromatic polycarbonates which comprise dioxydiarylcycloalkane structural units, and which have improved optical and thermal properties. It also relates to an improved process to produce the said polycarbonates from dihydroxydiphenylcyloalkanes, and also to mixtures of these polycarbonates with polymers, with fillers, with dyes and with conventional additives.

8 Claims, No Drawings

POLYCARBONATE COMPOSITION HAVING IMPROVED OPTICAL AND THERMAL PROPERTIES

CROSS-REFERENCE TO RELATED APPLICATIONS

This application is a national stage application (under 35 U.S.C. §371) of PCT/EP2011/055479, filed Apr. 8, 2011, which claims benefit of German Application No. 10 2010 014 726.5, filed Apr. 13, 2010, both of which are incorporated herein by reference in their entirety.

The invention relates to aromatic polycarbonates which comprise dioxydiarylcycloalkane structural units, and which have improved optical and thermal properties. It also relates to an improved process to produce the said polycarbonates from dihydroxydiphenylcycloalkanes, and also to mixtures of these polycarbonates with polymers, with fillers, with dyes and with conventional additives.

Polycarbonates produced from dihydroxydiarylcycloalkanes are known from EP 359 953 A, in particular polycarbonates made of 1,1-bis(4-hydroxyphenyl)-3,3,5-trimethylcyclohexane. These polycarbonates or, respectively, copolycarbonates made of 1,1-bis(4-hydroxyphenyl)-3,3,5-trimethylcyclohexane and of other bisphenols, e.g. bisphenol A, have high heat resistances, and are therefore used where mouldings made of the said polycarbonates have exposure to high temperatures. Desirable properties here, in particular in the case of transparent mouldings by way of example in light-scattering panels of lamps, are not only heat resistance but also good initial colour of the mouldings and adequate stability of the said colour during prolonged exposure to heat.

There has therefore been no lack of attempts to improve the optical properties of polycarbonates having the above-mentioned structural features according to the invention. By way of example, EP 718 354 A describes the use of phosphines to provide thermal stability. EP 1 240 240 A describes improvements in the polymer synthesis process for the polycarbonates according to the invention via use of low-metal-content sodium hydroxide solution during production by the interfacial process. However, none of the said measures was adequate to produce a polycarbonate having the structural features according to the invention and complying with the increased level of requirements placed upon the optical quality of the mouldings produced therefrom.

It was therefore an object of the invention to produce a polycarbonate which has the structural features according to the invention, where mouldings thereof in the freshly injection-moulded state have a degree of yellowing, measured via the yellowness index (Y.I.), of less than 2.0, and after hot-air ageing at 150° C. for a period of 250 hours their Y.I. is less than 7.0.

Surprisingly, it has now been found that the object of the invention is achieved in that the dihydroxydiphenylcycloalkane used for synthesis of the polycarbonate, in particular the 1,1-bis(4-hydroxyphenyl)-3,3,5-trimethylcyclohexane used, has minimum content of organic sulphur compounds, its sulphur content preferably being less than 1.5 ppm, particularly preferably less than 1.0 ppm, therefore giving a lower content of sulphur in the polycarbonate produced. This is all the more surprising since the prior art comprises many examples in which the presence of relatively large amounts of sulphur compounds, not only in bisphenols but also in polycarbonates, has a favourable effect on the colour of the polycarbonate. By way of example, JP 2005 060540 and JP 2006 028391 describe additions of sulphite to bisphenols in amounts larger than those mentioned above, where these give the resultant polycarbonate an excellent colour. WO 2007/004434 describes additions of dithionites to bisphenols, where these have art advantageous effect on the colour of the polycarbonate produced therefrom. Direct addition of aliphatic thio compounds to polycarbonates can also reduce their yellowness index, as can be found in U.S. Pat. No. 4,904,717. Addition of sulphur-containing antioxidants to polycarbonates likewise has a favourable effect on the stability of the colour of the polycarbonate, as described in JP 2004 217734. JP 2008 111047 also reveals an analogous relationship between sulphur content in the polycarbonate and the colour thereof. It is certainly not obvious from the cited prior art that a reduction in the sulphur content in bisphenols can be used to achieve better colours of the resultant polycarbonates. On the contrary, in the light of the methods known from the prior art, the person skilled in the art will consider it advantageous to increase sulphur content in the polycarbonate.

The invention therefore provides polycarbonates which comprise structural units of the general formula (I):

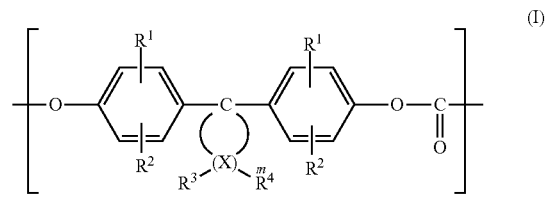

where $R^1$ and $R^2$, independently of one another, are H, halogen, $C_1$-$C_8$-alkyl, $C_5$-$C_6$-cycloalkyl, $C_6$-$C_{10}$-aryl and $C_7$-$C_{12}$-arylalkyl, where m is 4 or 5, where $R^3$ and $R^4$ are freely selectable for each X and, independently of one another, are H or $C_1$-$C_8$-alkyl, where X is carbon, in particular polycarbonates which comprise structural units of the general formula (IT)

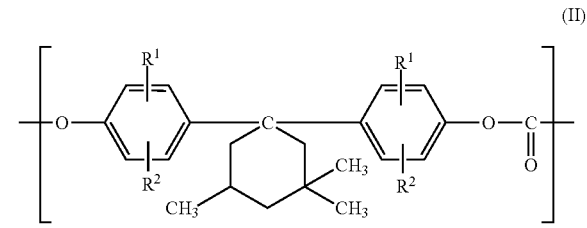

where the definition of $R^1$ and $R^2$ is as stated for formula (I), characterized in that the sulphur content of the pure polycarbonate composition is less than 2.0 ppm, preferably less than 1.5 ppm, where the sulphur content can by way of example be determined via a chemiluminescent method or via the ICP-M method (inductively coupled plasma mass spectrometry or mass spectrometry with inductively coupled plasma). These methods are known to the person skilled in the art and are adequately described in the literature. It is preferable that the mouldings of the composition in the freshly injection-moulded state have a degree of yellowing, measured via the yellowness index (Y.I.), of less than 2.0, preferably less than 1.8, and after hot-air ageing at 150° C. for a period of 250 hours their Y.I. is less than 7.0. These improved optical and thermal properties are directly related to the sulphur content of the dihydroxydiphenylcycloalkanes used of the general formula (Ia):

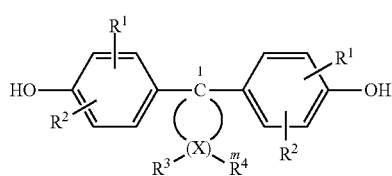
(Ia)

where the definitions of $R^1$, $R^2$, $R^3$, $R^4$, X and m are as stated for formula (I), in particular of the 1,1-bis(4-hydroxaryl)-3,3,5-trimethylcyclohexanes used of the general formula (IIa):

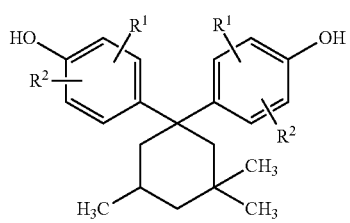
(IIa)

where the definition of $R^1$ and $R^2$ is as stated for formula (I).

The sulphur content of the bisphenols of the formulae (Ia) and (IIa) used to produce the polycarbonates according to the invention should be below 1.5 ppm, preferably below 1.0 ppm. Higher sulphur contents in the bisphenols have an increasingly disadvantageous effect on the yellowness index or, respectively, the tendency toward yellowing of the transparent mouldings freshly injection-moulded from the resultant polycarbonates. The sulphur content of the bisphenols used is determined via an elemental analysis and refers to "S" (MM 32 g/mol). The sulphur content refers to both inorganic and organic sulphur compounds, but mainly to organic sulphur compounds, where these can be present as undesirable ancillary components in the bisphenol. These sulphur compounds can either be present inherently in the bisphenol, e.g. through synthesis using sulphur-containing cocatalysts, or can have been added in the form of stabilizers to the bisphenol, an example being sodium dithionite. According to the invention, the organic sulphur compounds inherently present in the bisphenols, where these are introduced into the said bisphenols during their synthesis, e.g. in the form of cocatalysts or in the form of other foreign substances, can mostly be eliminated via methods known from the literature, e.g. via washing with suitable acids or alkali solutions during the work-up of the bisphenols.

The polycarbonates according to the invention can be homopolymers having one and the same structural repeat unit of formula (I), or can be copolymers having structural repeat units of formula (I) and having one or more other structural units of the general formula (III):

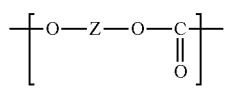
(III)

where Z is an aromatic or alkylaromatic moiety.

Homopolymers according to the invention are preferably those made of bisphenols of the general formula (IIa), in particular those made of 1,1-bis(4-hydroxyphenyl)-3,3,5-trimethylcyclohexane (BPTMC). Copolycarbonates according to the invention are preferably those made of BPTMC and bisphenol A. The molar proportion of BPTMC, based on the total molar amount of bisphenols used, can vary in the polycarbonates according to the invention within relatively wide limits from 0 to 100 mol % of BPTMC, but preferably from 2 to 90 mol % of BPTMC, particularly preferably from 10 to 80 mol % of BPTMC and very particularly preferably from 30 to 70 mol % of BPTMC.

The polycarbonates according to the invention are produced from low-sulphur-content bisphenols produced for this purpose. In the case of the copolycarbonates according to the invention, the definitions relating to sulphur content for the other bisphenols concomitantly used, where these are present in the structural unit having the general formula (III), are the same as those set out above. The sulphur content of these bisphenols, where this results from undesired ancillary components in the bisphenol, should also be smaller than 1.5 ppm and preferably smaller than 1.0 ppm.

A feature of the polycarbonates according to the invention, produced from low-sulphur-content bisphenols, when they are compared with polycarbonates of this type that have been produced from bisphenols having markedly higher sulphur contents, is better intrinsic colour of the mouldings produced via injection moulding from the said polycarbonates. This intrinsic of use fresh transparent injection mouldings is characterized by a very small yellowness index (Y.I.), determined to ASTM E313 an injection-moulded plaques of defined thickness. All of the data relating to the Y.I. of the polycarbonates according to the invention refer to this method of determination. The Y.I. values for the polycarbonates according to the invention are below 2.0, preferably below 1.8, and it is also fully possible in particular cases to obtain polycarbonate qualities with Y.I. values of 1.10. The content of structural units of the general formula (I) here can vary as desired within relatively wide limits in relation to that of structural units of use general formula (III) in the polycarbonate. When the polycarbonates according to the invention with pale intrinsic colour are compared with the polycarbonates not according to the invention, made of bisphenols having higher sulphur consents, they moreover also exhibit higher stability of the said improved intrinsic colour over a prolonged period of relatively high thermal stress. Although, the yellowness index increases during prolonged heat-ageing of the mouldings, it nevertheless remains below Y.I.=7.0 during heating at 150° C. over a period of 250 hours. The method here involves free suspension of standard transparent mouldings (plaques of identical thickness, as used to determine Y.I.) in a Heraeus drying oven and exposing these for 250 hours to a temperature of 150° C. in air at atmospheric pressure, and removing them after cooling to room temperature and measuring Y.I. as described above. These standard test conditions provide a very good approximation to actual practical conditions. The polycarbonates according to the invention are therefore preferably suitable for use in the form of transparent or opaque or pale-colour mouldings which are produced by injection-moulding or by extrusion and which have exposure to a relatively high level of, if appropriate, relatively prolonged thermal stress, where the intention is that there is no substantial resultant alteration of their intrinsic colour. These preferred applications can also be sheets or foils produced by a casting process from the solution of the polycarbonate according to the invention in a suitable solvent.

The polycarbonates according to the invention can either be processed thermoplastically or can be processed from solution in suitable solvents, e.g. cyclic ethers. They are preferably of high molecular weight, having molar masses Mw (weight-average molar mass, determined, via size-exclusion gel chromatography after prior calibration with calibrator substances consisting of PS or of polycarbonate) of from 10 000 to 300 000 g/mol, preferably from 15 000 to 80 000 g/mol and particularly preferably from 20 000 to 40 000 g/mol.

The polycarbonates according to the invention can have branching due to incorporation of suitable polyfunctional monomers into the polymer chain; an example of a suitable trifunctional monomer is 1,1,1-tris(p-hydroxyphenyl)ethane, or 1,3,5-tris(p-hydroxyphenyl)benzene. The polycarbonates according to the invention can have terminal groups incorporated specifically, where the incorporation of these permits adjustment of the molecular weight of the polycarbonates in particular during their production by the interfacial process. These terminal groups are incorporated, via suitable monophenols, e.g. phenol, tert-butylphenol or isooctylphenol, into the polycarbonate.

The polycarbonates according to the invention can be produced in solution by conventional interfacial processes or in the melt by the transesterification process using aryl or alkyl carbonates (see also H. Schnell, "Chemistry and Physics of Polycarbonates", Polymer Reviews, Vol. IX, pp. 33 ff., Interscience Publishers, 1964). The interfacial process is particularly suitable for homo- or copolycarbonates having high glass transition temperatures and/or having high molar masses Mw. The transesterification process is suitable for polycarbonates according to the invention having adequately high melt flowability at relatively high molar masses.

Diphenols suitable for the process according, to the invention to produce polycarbonate have been widely described in the prior art.

The materials used to produce a copolycarbonate comprise not only component (Ia) and/or (IIa) but also one or more other dihydroxyaryl compounds, and also solvent, phosgene, chain terminator and catalysts (in the interfacial process) or other dihydroxyaryl compounds and diaryl carbonates and catalysts (in the melt transesterification process).

Examples of suitable diphenols are hydroquinone, resorcinol, dihydroxybtphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropylbenzenes, and also their alkylated, ring-alkylated and ring-halogenated compounds.

Preferred, diphenols are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxybiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and other statable dihydroxyaryl compounds are described by way of example in DE-A 3 832 396, FR-A 1 561 518, in M. Schnell, Chemistry and Physics of Polycarbonates, Interscience Publishers, New York 1964, pp. 28 ff.; pp. 102 ff. and in D. G. Legrand, J. T. Bendler, Handbook of Polycarbonate Science and Technology, Marcel Dekker New York 2000, pp. 72 ff.

In the case of the homopolycarbonates, only one diphenol is used, but in the case of the copolycarbonates a plurality of diphenols are used, and the diphenols used can, of course, like all other auxiliaries and chemicals added to the synthesis process, have contamination by the contaminants deriving from their individual synthesis, handling and storage, but it is desirable to operate with raw materials of maximum purity.

The diaryl carbonates suitable for reaction with the dihydroxyaryl compounds in the melt transesterificiation process are those of the general formula (II)

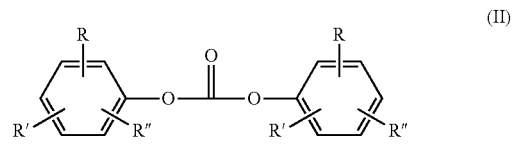

in which

R, R' and R", independently of one another, are identical or different and are hydrogen, linear or branched $C_1$-$C_{34}$-alkyl, $C_7$-$C_{34}$-alkylaryl or $C_6$-$C_{34}$-aryl, and R can moreover also be —COO—R''', where R''' is hydrogen, linear or branched $C_1$-$C_{34}$-alkyl, C7-$C_{34}$-alkylaryl or $C_6$-$C_{34}$-aryl.

Examples of preferred diaryl carbonates are diphenyl carbonate, methylphenyl phenyl carbonates and di(methylphenyl) carbonates, 4-ethylphenyl phenyl carbonate, di(4-ethylphenyl) carbonate, 4-n-propylphenyl carbonate, di(4-n-propylphenyl) carbonate, 4-isoprpylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-octylphenyl pentylphenyl) carbonate, 4-n-hexylphenyl phenyl carbonate, di(4-n-hexylphenyl) carbonate, 4-isophenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl)phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl, carbonate, di(4-tritylphenyl) carbonate, methyl salicylate phenyl carbonate, di(methyl salicylate) carbonate, ethyl salicylate phenyl carbonate, di(ethyl salicylate) carbonate, n-propyl salicylate phenyl carbonate, di(n-propyl salicylate) carbonate, isopropyl salicylate phenyl carbonate, di(isopropyl salicylate) carbonate, n-butyl salicylate phenyl carbonate, di(n-butyl salicylate) carbonate, isobutyl salicylate phenyl carbonate, di(isobutyl salicylate) carbonate, tert-butyl salicylate phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl carbonate, di[4-(1-methyl-phenylethyl)phenyl]-carbonate and di(methyl salicylate) carbonate.

Diphenyl carbonate is very particularly preferred.

It is possible to use either one diaryl carbonate or else various diaryl carbonates.

The diaryl carbonates can also be used with residual contents of the monohydroxyaryl compounds from which they were produced. The residual contents of the monohydroxyaryl compounds can be up to 20% by weight, preferably up to 10% by weight, particularly preferably up to 5% by weight and very particularly preferably up to 2% by weight.

The amount used of the diaryl carbonate(s), based on the dihydroxyaryl compound(s) is generally from 1.02 to 1.30 mol, preferably from 1.04 to 1.25 mol, particularly preferably from 1.045 to 1.22 mol, very particularly preferably from 1.05 to 1.20 mol, per mole of dihydroxyaryl compound. It is also possible to use mixtures of the abovementioned diaryl carbonates, and the molar amounts listed above per mole of dihydroxyaryl compound then refer to the total molar amount of the mixture of the diaryl carbonates.

The monofunctional chain terminators needed to regulate the molecular weight, an example being phenol or alkylphenols, in particular phenol, p-tert-butylphenol, isooctylphenol, cumylphenol, cholorcarbonic esters of these, or acyl chlorides of monocarboxylic acids or, respectively, mixtures of the said chain terminators, are either introduced to the reaction with the bisphenolate(s) or else are added at any desired juncture of the synthesis process, as long as phosgene or chlorocarbonic acid terminal groups are still present in the reaction mixture or, respectively, in the case of the acyl chlorides and chlorocarbonic esters as chain terminators, as long as there are sufficient phenolic terminal groups available on the polymer that is being formed. However, it is preferable that the chain terminator(s) is/are added after the phosgenation process at a location or at a juncture at which no residual phosgene is present, but the catalyst has not yet been added. As an alternative, they can also be added prior to the catalyst, together with the catalyst, or in parallel.

Branching agents or branching agent mixtures are, if appropriate, added in the same manner to the synthesis process. However, branching agents are usually added before the chain terminators. The compounds generally used comprise trisphenols, quaterphenols or acyl chlorides of tri- or tetracarboxylic acids, or mixtures of the polyphenols or of the acyl chlorides. Examples of some of the compounds that are suitable as branching agents, having three or more phenolic hydroxy groups are phloroglucinol, 4,6-dimethyl-2,4,6-tri(4-hydroxyphenyl)-2-heptene, 4,6-dimethyl-2,4,6-tri(4-hydroxyphenyl)heptane, 1,3,5-tri(4-hydroxyphenyl) benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, and tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihyroindole and 1,1,1-tri(4-hydroxyphenly)ethane.

The catalysts preferably used in the interfacial synthesis of polycarbonate are tertiary amines, in particular triethylamine, tributylamine, triocylamine, N-ethylpiperidine, N-methylpiperidine, N-iso/n-propylpiperidine, quaternary ammonium, salts such as tetrabutylammonium hydroxide, chloride, bromide, hydrogensulphate, and tetrafluoroborate, and the corresponding tributylbenzylammonium and tetraethylammonium salts, and also the phosphonium compounds corresponding to these ammonium compounds. These compounds are described in the literature as typical interfacial catalysts and are commercially available and are familiar to the person skilled in the art. The catalysts can be added into the synthesis process individually, in a mixture or else alongside one another or in sequence, also if appropriate prior to the phosgenation process, but preference is given to additions after introduction of the phosgene, except when the catalysts used comprise an onium compound or a mixture onium compounds. In that case, addition prior to addition of the phosgene is preferred. The catalyst(s) can be added undiluted, in an inert solvent, preferably the solvent for the polycarbonate synthesis, or else in the form of aqueous solution, and in the case of the tertiary amines the addition then takes the form of ammonium salts of these with acids, preferably mineral acids, in particular hydrochloric acid. If a plurality of catalysts are used, or portions of the total amount of catalyst are added, it is also, of course, possible to use different addition methods at different locations or at different times. The total amount used of the catalysts is from 0.001 to 10 mol % based on moles of bisphenols used, preferably from 0.01 to 8 mol %, particularly preferably from 0.05 to 8 mol %.

Catalysts that can be used in the melt transesterifcation process to produce polycarbonates are the basic catalysts known from the literature, examples being alkali metal hydroxides and alkaline earth metal hydroxides, alkali metal, oxides and alkaline earth metal oxides, ammonium salts, e.g. ammonium salts or phosphonium salts. It is preferable to use onium salts, particularly phosphonium salts, in the synthesis process. Examples of these phosphonium salts are those of the general formula (IV)

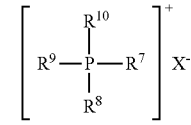

(IV)

in which $R^{7-10}$ are identical or different, if appropriate substituted, $C_1$-$C_{10}$-alkyl, $C_6$-$C_{14}$-aryl, $C_7$-$C_{15}$-arylalkyl or $C_5$-$C_6$-cycloalkyl preferably methyl or $C_6$-$C_{14}$-aryl, particularly preferably methyl or phenyl, and X is an anion selected from the group of hydroxide, sulphate, hydrogensulphate, hydrogencarbonate, carbonate, halide, preferably chloride, and alkyloxy or aryloxy of the formula —$OR^{11}$ where $R^{11}$ is an, if appropriate substituted, $C_6$-$C_{14}$-aryl, $C_7$-$C_{15}$-arylalkyl or $C_5$-$C_6$-cycloalkyl moiety, or $C_1$-$C_{20}$-alkyl, preferably phenyl.

Particularly preferred catalysts are tetraphenylphosphonium chloride, tetraphenylphosphonium hydroxide and tetraphenylphophonium phenolate, and very particular preference is given to tetraphenylphosphenium phenolate.

The preferred amounts used of the catalysts, based on one mole of dihydroxyaryl compound, are from $10^{-8}$ to $10^{-3}$ mol, particularly from $10^{-7}$ to $10^{-4}$ mol.

It is also possible, if appropriate, to use cocatalysts in order to increase the polycondensation rate.

By way of example, these can be alkaline salts of alkali metals and of alkaline earth metals, examples being hydroxides and, if appropriate substituted, $C_1$-$C_{10}$-alkoxides and $C_6$-$C_{14}$-aryloxides of lithium, sodium and potassium, preferably hydroxides and, if appropriate substituted, $C_1$-$C_{10}$-alkoxides or $C_6$-$C_{14}$-aryloxides of sodium. Preference is given to sodium hydroxide, sodium phenolate or the disodium salt of 2,2-bis(4-hydroxyphenyl)propane.

If ions of alkali metals or of alkaline earth metals are introduced in the form of their salts, the amount of ions of alkali metals or of alkaline earth metals, determined by way of example via atomic absorption spectroscopy, is from 1 to 500 ppb, preferably from 5 to 300 ppb and most preferably from 5 to 200 ppb, based on polycarbonate to be formed. However, preferred embodiments of the process according to the invention use no alkali metal salts.

The polycarbonate synthesis process can be carried out continuously or batchwise. The reaction can therefore take place in stirred tanks, tubular reactors, pumped-circulation reactors or stirred-tank cascades or combinations thereof. By using the abovementioned mixing units, it has to be ensured that, as far as possible, separation of the aqueous and organic phase is delayed until complete reaction of the synthesis mixture has taken place, i.e. the mixture comprises no residual hydrolysable chlorine from phosgene or from chlorocarbonic esters.

After introduction of the phosgene in the interfacial process it can be advantageous to mix the organic phase and the aqueous phase for a certain time before, if appropriate, adding branching agents, to the extent that these are not added together with the bisphenolate, and before adding chain terminator and catalyst. This type of after-reaction time can be advantageous after each addition. These continued-stirring times are from 10 seconds to 60 minutes, preferably from 30 seconds to 40 minutes, particularly preferably from 1 to 15 minute.

The organic phase can be composed of one solvent or of a mixture of a plurality of solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene and mixtures of these. However, it is also possible to use aromatic hydrocarbons such as benzene, toluene, m/p/o-xylene, or aromatic ethers such as anisole, alone or in a mixture with, or in addition to, chlorinated hydrocarbons. Another embodiment of the synthesis process uses solvents which do not dissolve polycarbonate but merely begin to swell it. It is therefore also possible to use non-solvents for polycarbonate in combination with solvents. The solvents used here can also comprise solvents soluble in the aqueous phase, e.g. tetrahydrofuran, 1,3/1,4-dioxane or 1,3-dioxolane, when the partner solvent forms the second organic phase.

When the at least two-phase reaction mixture has reacted completely and comprises at most residual traces (<2 ppm) of chlorocarbonic esters, it is allowed to settle in order to achieve phase separation. The aqueous alkaline phase may be entirely or to some extent returned in the form of aqueous phase to the polycarbonate synthesis process, or can be passed to waste-water treatment, where solvent content and catalyst content are removed and returned. In another treatment variant, the organic contaminants, in particular solvents and polymer residues, are removed and, if appropriate after adjustment to a particular pH, e.g. via addition of sodium hydroxide solution, the salt is removed and can by way of example be passed to the chloralkali electrolysis process, while the aqueous phase is, if appropriate, returned to the synthesis process.

The organic phase comprising the polycarbonate can then be purified to remove all of the alkaline, ionic or catalytic contaminants. After one more settling procedures, the organic phase also still comprises some content of the aqueous alkaline phase in the form of fine droplets, and also comprises the catalyst, generally a tertiary amine. The effect of the settling procedures can if appropriate be increased by passing the organic phase through settling tanks, stirred tanks, coalescers or separators or combinations thereof, and it is possible here, if appropriate, to add wafer in each or some of the separation steps, possibly with use of active or passive mixing units.

After this crude process to remove the alkaline, aqueous phase, the organic phase is washed one or more times with dilute acids, mineral acids, carboxlic acids hydroxycarboxylic acids and/or sulphonic acids. Preference is given to aqueous mineral acids, in particular hydrochloric acid, phosphorous acid and phosphoric acid and mixtures of the said acids. The concentration of these acids should be in the range from 0.001 to 50% by weight, preferably from 0.01 to 5% by weight.

The organic phase is moreover repeatedly washed with deionized or distilled water. After the individual washing steps, the organic phase, if appropriate with portions of the aqueous phase dispersed, is removed by means of settling tanks, stirred tanks, coalesces or separators or combinations thereof, where the washing water can be added between the washing steps if appropriate with use of active or passive mixing units.

Between the said washing steps, or else after the wash, it is possible if appropriate to add acids, preferably dissolved. In the solvent on which the polymer solution is based. It is preferable here to use hydrogen chloride gas and phosphoric acid or phosphorous acid, and these can also be used in the form of mixtures if appropriate.

Examples of aromatic dicarboxylic acids suitable for the production of the polyester carbonates are phthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulphone dicarboxylic acid, 2,2-bis(4-carboxyphenyl)propane, trimethyl-3-phenylindane-4,5'-dicarboxylic acid.

Among the aromatic dicarboxylic acids, it is particularly preferable to use terephthalic acid and/or isophthalic acid.

Derivatives of the dicarboxylic acids are the dicacyl dihalides and the dialkyl dicarboxylates, in particular the diacyl dichlorides and the dimethyl dicarboxylates.

The replacement of the carbonate groups by the aromatic dicarboxylic ester groups takes place in essence stoichiometrically and also quantitatively, and the molar ratio of the reactants is then in turn also found in the finished polyester carbonate. The aromatic dicarboxylic ester groups can be incorporated either randomly or else blockwise.

For the purposes of the invention, examples of $C_1$-$C_4$-alkyl are methyl, ethyl, n-propyl, isopropyl, n-butyl, sec-butyl, and tert-butyl, and examples of $C_1$-$C_6$-alkyl in addition to the above are n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl and 1-ethyl-2-methylpropyl, and samples of $C_1$-$C_{10}$-alkyl in addition to the above are n-heptyl and n-octyl, pinacyl, adamantyl, the isomeric methyl moieties, n-nonyl and n-decyl, and examples of $C_1$-$C_{34}$-alkyl in addition to the above are n-dodecyl, n-tridecyl, n-tetradecyl, n-hexadecyl and n-octadecyl. The same applies to the corresponding alkyl moiety by way of example in aralkyl and, respectively, alkylaryl, alkylphenyl and alkylcarbonyl moieties. Examples of alkylene moieties in the corresponding hydroxyalkyl and aralkyl and, respectively, alkylaryl moieties are the alkylene moieties corresponding to the above alkyl moieties.

Aryl is a carbocyclic aromatic moiety having from 6 to 34 skeletal carbon atoms. The same applies to the aromatic portion of an arylalkyl moiety, also termed aralkyl moiety, and also to aryl constituents of groups of higher complexity, e.g. arylcarbonyl moieties.

Examples of $C_6$-$C_{34}$-aryl are phenyl, o-, p-, m-tolyl, naphthyl, phenanthrenyl, anthracenyl and fluorenyl.

Each of arylalkyl and, respectively, aralkyl is independently a straight-chain, cyclic, branched or unbranched alkyl moiety as defined above which can have single, multiple or complete substitution by aryl moieties as defined above.

The above lists are given by way of example and are not to be understood as limiting.

The polycarbonates according to the invention can also comprise amounts of from 0 to 5 parts by weight, preferably from 0 to 2.5 parts by weight, particularly preferably from 0 to 1 part by weight (based in each case on the total number of parts by weight of the polycarbonate components) of conventional additives, e.g. mould-release agents, flow aids, heat stabilizers, UV absorbers and/or IR absorbers, flame retardants, dyes and fillers, and also other polymers.

The compositions according to the invention can also comprise the additional substances conventional for these thermoplastics in the customary amounts, example being fillers, UV stabilizers, IR stabilizers, heat stabilizers, antistatic agents and pigments, and other colorants; mould-release behaviour, flow behaviour and/or flame resistance, can also be improved via addition of external mould-release agents, flow agents, and/or flame retardants (e.g. alkyl and aryl phosphites, alkyl and aryl phosphates, alkyl- and arylphosphanes, alkyl and aryl low-molecular-weight carboxylic esters, halogen compounds, salts, chalk, powdered quartz, glass fibres and carbon fibres, pigments and combinations of these. These compounds are described by way of example in WO 99/55712, pp. 15-25, and in "Plastics Additives", R. Gächter and H. Müller, Hanser Publishers 1983).

The mould-release agents added if appropriate to the compositions according to the invention are preferably those selected from the group consisting of pentaerythritol tetrastearate, glycerol monostearate, long-chain fatty acid esters, such as stearyl stearate and propoanediol stearate, and also mixtures of these. The amounts used of the mould-release agents are from 0.05% by weight to 2.0% by weight, based on the moulding composition, preferably from 0.1% by weight to 1.0% by weight, particularly preferably from 0.15% by weight to 0.60% by weight and very particularly preferably from 0.2% by weight to 0.5% by weight, based on the moulding composition.

Examples of suitable additional substances are described in "Additives for Plastics Handbook, John Murphy, Elsevier, Oxford 1999", and in "Plastics Additives Handbook, Hans Zweifel, Hanser, Munich 2001".

Examples of suitable antioxidants and, respectively, heat stabilizers are: alkylated monophenols, alkylthiomethylphenols, hydroquinones and alkylated hydroquinones, tocopherols, hydroxylated thiodiphenyl ethers, alkylidene bisphenols, O-, N- and S-benzyl compounds, hydroxybenzylate molonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid suitable thiosynergists, secondary antioxidants, phosphites and phosphonites, benzoferanones and indolinones.

Preference is given to organic phosphines (e.g. triphenylphosphine, phosphites, phosphonates and phosphates (e.g., triisooctyl phosphate, TOF), mostly to those in which the organic moieties are composed entirely or to some extent of, if appropriate substituted, aromatic moieties.

Suitable complexing agents for heavy metals and for neutralization of traces of alkali are o/m phosphoric acids, or completely or partially esterified phosphates or phosphites.

Suitable light stabilisers (UV absorbers) are 2-(2'-hydroxyphenyl)benzotriazoles, 2-hydroxy-benzophenones, esters of substituted and unsubstituted benzoic acids, acrylates, sterically hindered amines, oxamides, and also 2-(hydroxyphenyl)-1,3,5-triazines, respectively, substituted hydroxyalkoxyphenyl, 1,3,5-triazoles, preference being given to substituted benzotriazoles, e.g. 2-(2'-hydroxy-5'-methylphenyl)benzotriazoles, 2-(2'-hydroxy-3',5'-di-tert-butylphenyl)benzotriazoles, 2-(2'-hydroxy-3'-tert-butyl-5'-methylphenyl)-5-chlorobenzotriazoles, 2-(2'-hydroxy-3',5'-tert-butyl-phenyl)-5-chlorobenzotriazoles, 2-(2'-hydroxy-5'-tert-octylphenyl)benzotriazoles, 2-(2'-hydroxy-3',5'-di- tert-amylphenyl)benzotriazoles, 2-[2'-hydroxy-3'-(3",4",5",6"-tetrahydrophthalimidoethyl)-5'-methylphenyl] benzotriazoles and 2,2'-methylenebis[4-(1,1,3,3-tetramethylbutyl)-6-(2H-benzotriazol-2-yl)phenol].

Other suitable UV stabilizers are those selected from the group consisting of benzotriazoles (e.g. Tinuvin products from Ciba), triazine CGX-06 from Ciba), benzophenones (Uvinul products from BASF), cyanoacrylates (Uvinul products from BASF), cinnamic esters and oxanilides, and also mixtures of these UV stabilizers.

Examples of suitable UV absorbers are:
a) malonic esters of the formula (I):

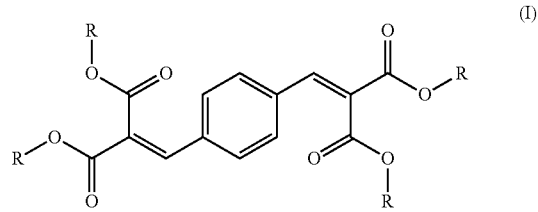

in which R is alkyl. It is preferable that R is C1-C6-alkyl, in particular C1-C4-alkyl and particularly preferably ethyl.
b) Benzotriazole derivatives of formula (II):

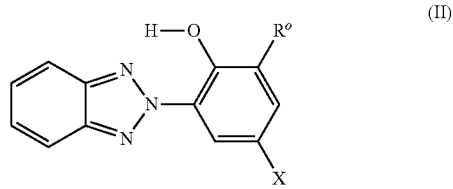

In formula (II), R° comprising and X are identical or different, being H or alkyl or alkylaryl.

Preference is given here to Tinuvin® 329, where X=1,1,3,3-tetramethylbutyl sod R°=H, Tinuvin® 350, where X=tert-butyl and R0=2-butyl and Tinuvin® 234, where X and R°=1,1-dimethyl-1-phenyl c) Dimeric benzotriazole derivatives of formula (III):

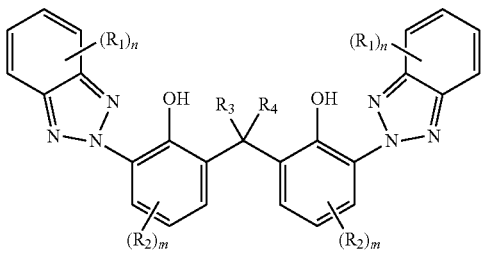

(III)

In formula (III), R1 and R2 are identical or different and are H, halogen, C1-C10-alkyl, C5-C10-cycloalkyl, C7-C13-aralkyl, C6-C14-aryl, —OR5 or —(CO)—O—R5, where R5=H or C1-C4-alkyl.

In formula (III), R3 and R4 are likewise identical or different and are H, C1-C4-alkyl, C5-C6-cycloalkyl, benzyl, or C6-C14-aryl.

In formula (III), m is 1, 2 or 3 and n is 1, 2, 3 or 4.

Preference is given here to Tinuvin® 360, where R1=R3=R4=H; n=4; R2=1,1,3,3-tetramthylbutyl; m=1 d) Dimeric benzotriazole derivatives of formula (IV):

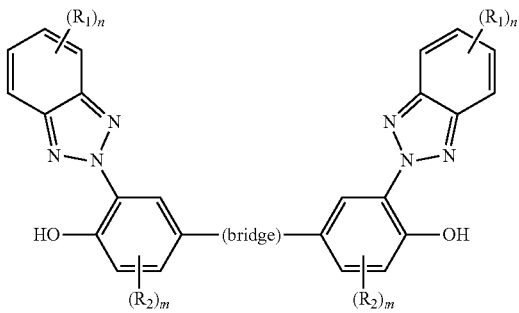

(IV)

in which the bridge is

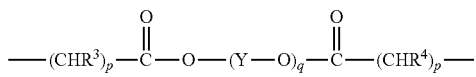

where the definitions of R, R, m and n are as mentioned for formula (III), and in which p is an integer from O to 3, q is an integer from 1 to 10, Y is —CH2-CH2-, —(CH2)3-, —(CH2)4-, —(CH2)5-, —(CH2)6-, or CH(CH3)-CH2- and the definitions of R3 and R4 are as mentioned for formula (III).

Preference is given here to Tinuvin® 840, where R1=H; n=4; R2=tert-butyl; m=1; the attachment of R2 is in ortho-position with respect to the OH group; R3=R4=H; p=2; Y=—(CH2)5-; q=1 e) Triazine derivatives of formula (V):

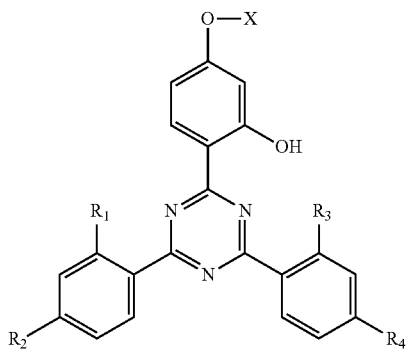

(V)

in which R1, R2, R3, and R4 are identical or different and are H, alkyl, aryl, CN or halogen and X is alkyl, preferably isooctyl.

Preference is gives here to Tinuvin® 1577, where R1=R2=R3=R4=H; X=hexyl, and also to Cyasorb® UV-1 164, where R1=R2=R3=R4=methyl; X octyl f) Triazine derivatives of the following formula (Va):

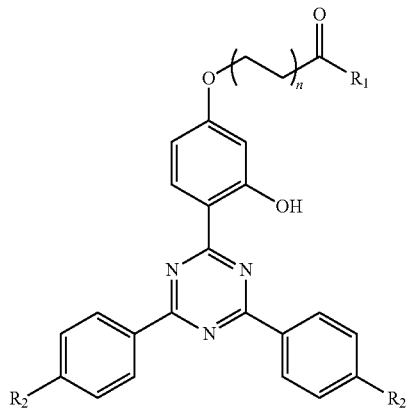

(Va)

in which R1 is C1 alkyl to C17-alkyl, R2 is H or C1-alkyl to C4-alkyl and n is from 0 to 20.

g) Dimeric triazine derivatives for the formula (VI):

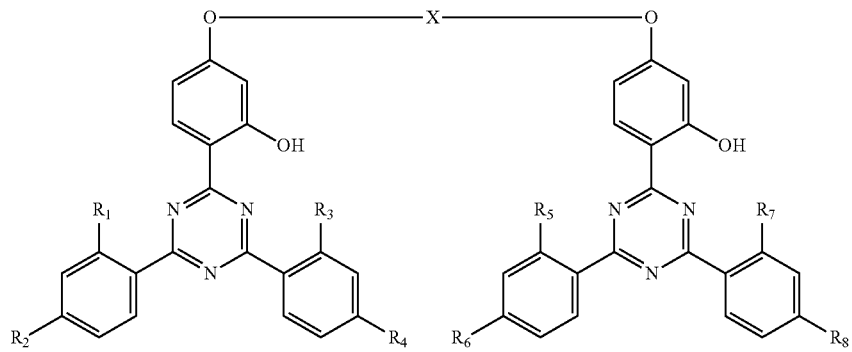

(VI)

in which R1, R2, R3, R4, R5, R6, R7, and R8 can be identical or different and are H, alkyl, CN or halogen and X is alkylidene, preferably methylidene or —(CH2 CH2-O—)n—C(=O)— and n is from 1 to 10, preferably from 1 to 5, in particular from 1 to 3.

h) Diarylcyanoacrylates of the formula (VII):

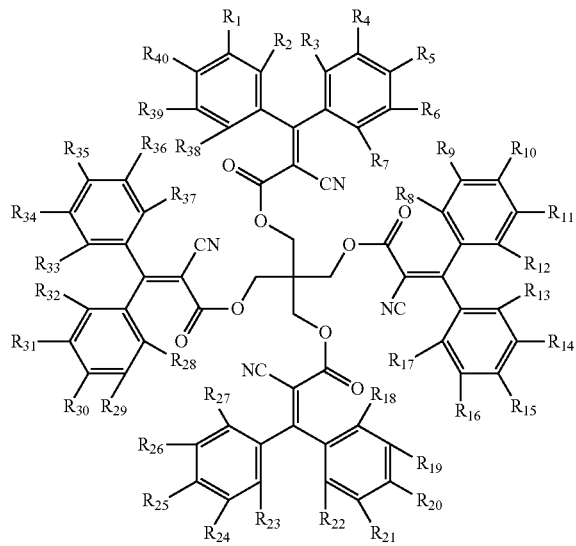

(VII)

in which R to R40 can be identical or different and are H, alkyl CN or halogen.

Preference is given here to Uvinul® 3030, where R1 to R40=H.

Particularly preferred UV stabilizers for the moulding compositions according to the invention are compounds from the group consisting of the benzotriazoles (b) and dimeric benzotriazoles (c and d), the malonic esters (a) and the cyanoacrylates (h), and also mixtures of the said compounds.

The amounts of the UV stabilizers are from 0.01% by weight to 15.00% by weight, based on the moulding composition, preferably amounts of 0.05% by weight to 1.00% by weight, particularly preferably amounts of from 0.08% by weight to 0.5% by weight and very particularly preferably amounts of from 0.1% by weight to 0.4% by weights based on the entire composition.

Polypropylene glycols alone or in combination with, for example, sulphones or with sulphonamides, as stabilizers, can be used to counter damage by gamma rays.

These and other stabilizers can be used individually or in combinations, and can be added in the forms mentioned to the polymer.

Suitable additional flame-retardant substances are phosphate esters, i.e. triphenyl phosphate, resorcinol diphosphate, bromine-containing compounds, such as brominated phosphoric esters, brominated oligocarbonates and polycarbonates, and also preferably salts of fluorinated organic sulphonic acids.

Suitable impact modifiers are butadiene rubber having grafted-on styrene-acrylonitrile or methyl methacrylate, ethylene-propylene rubbers having grafted-on maleic anhydride, ethyl and butyl acrylate rubbers having grafted-on methyl methacrylate or styrene-acrylonitrile, and interpenetrating siloxane and acrylate networks having grafted-on methyl methacrylate or styrene-acrylonitrile.

Other materials that can be added are colorants, such as organic dyes or pigments or inorganic pigments, IR absorbers, individually, in a mixture or else is combination with stabilizers, with glass fibres, with (hollow) glass beads, or with inorganic fillers.

Preference, particular preference or very particular preference is given to embodiments which use parameters, compounds, definitions and explanations mentioned in the context of preferred, particularly preferred or very particularly preferred and, respectively, with preference, etc.

However, the definitions, parameters, compounds and explanations listed in the description in general terms or in preferred ranges can also be combined as desired with one another, i.e. between the respective ranges and preferred ranges.

The polycarbonate compositions according to the invention are preferably produced via compounding, for example by means of a multiscrew extruder.

The thermoplastic moulding compositions according to the invention are produced by mixing the respective constituents in a known manner and compounding and extruding them in the melt at temperatures of from 240° C. to 300° C. in conventional assemblies, such as internal mixers, extruders and twin-shaft-screw systems.

The mixing of the individual constituents can take place in a known manner either in succession or else simultaneously.

The invention likewise provides processes to produce the moulding compositions and the use of the moulding compositions to produce mouldings, and also the mouldings themselves.

The moulding compositions according to the invention can be used to produce mouldings of any type. These can be produced via injection moulding, extrusion and blow moulding processes. Another type of processing is the production of mouldings via thermoforming from prefabricated sheets or foils.

The polycarbonate compositions according to the invention, if appropriate blended, with other thermoplastics and/or with conventional additional substances, can, when processed to give any desired mouldings/extrudates, be used wherever known polycarbonates, polyester carbonates and polyesters are already used. Their property profile makes them particularly suitable as materials for the injection-moulding of relatively large mouldings, such as automobile windscreens. However, the low water absorption and the improved dimensional stability associated therewith makes also particularly suitable as substrate materials for optical data storage systems, e.g. CD, CD-R, DVD, DVD-R, Blu-ray disc or advanced optical disc (AOD), but can also by way of example be used in the form of foils in the electrical sector, in the form of mouldings in vehicle construction, in particular for (head) lamp housings in that sector, and for scattering panels and lamp covers, and in the form of panels for coverings in the safety/security sector.

Preferred applications for the polycarbonates according to the invention are injection mouldings, extrudates, e.g. sheets, foils, profiles, semifinished, products, and also cast foils made of high-molecular-weight polycarbonates, and also preparations made of solutions of the polycarbonates according to the invention for application sectors with stringent requirements placed upon the resistance of the mouldings to high temperatures. Particularly preferred applications are transparent, translucent or opaque, and also in pale colours, in which the intrinsic colour and light transmittance are of particular importance.

For the purposes of the present invention, ppm means parts by weight unless otherwise stated.

The examples below are intended to illustrate the invention, without restricting the same to the scope of the examples.

EXAMPLES

Determination of Sulphur Content

The sulphur content was determined by a chemiluminescent method, known to the person skilled is the art.

Examples 1-3 (According to the Invention)

(Production of Copolycarbonates Having 44% by Weight of BP-TMC and 56% by Weight of BPA)

The reaction of the bisphenols with phosgene is carried out by the known interfacial process in a combination assembly made of pumped-circulation reactor and tubular reactor. A pumped-circulation reactor here is composed of a pumped-circulation circuit, of a pump for pumped circulation of the reaction emulsion, feed points, if appropriate designed in the form of mixers, for organic phase (solvent comprising phosgene) and aqueous phase (alkali solution and diphenol component), a heat exchanger, and also a holding tank, which has been equipped in parallel with a means of removal for the continuous removal of a substream. A tabular reactor here is composed of mixing tubes and holding tubes, and has been installed downstream of the pumped-circulation reactor, behind the removal point of the holding tank.

The following are fed into a pumped-circulation reactor prior to the pump by way of a T-piece: 10 000 kg/h of an alkaline solution of bisphenol A in dilute sodium hydroxides solution, which comprises 14.9% by weight of BPA having an OH excess of 0.17% by weight, and 8191 kg/h of an alkaline solution of bisphenol TMC [1,1-bis(4-hydroxyphenyl)-3,3,5-trimethylcyclohexane] in dilute sodium hydroxide solution which comprises 14.3% by weight of BP-TMC having an OH excess of 0.22% by weight. The following are fed by way of a farther T-piece: 1285 kg/h of phosgene, dissolved in 17 760 kg/h of solvent, which is composed of 30% by weight of methylene chloride and 50% by weight of monochlorobenzene. In order to maintain basicity, 510 kg/h of a 50% strength sodium hydroxide solution are fed at a further downstream T-piece, and the reaction mixture is passed back to the pump by way of the heat exchanger and the holding container, and the abovementioned mass streams are added during this process.

The temperature is 38° C.

A portion of the emulsion which is of the same magnitude as the entirety of the inflowing raw materials is passed prior to the feed points for BPA and phosgene from the holding container to a further pump and pumped through a tubular reactor, 327 kg/h of a 50% strength sodium hydroxide solution, and also 40.1 kg/h of a melt of pure phenol are added as chain terminators to the said stream. After a residence time of about 10 minutes, 357 kg/h of a 7% strength by weight solution of N-ethylpiperidine in a solvent mixture (50 parts by weight of methylene chloride and 50 parts by weight of monochlorobenzene) are added and the emulsion is pumped through a further tubular reactor by means of a further pump.

After a residence time of 10 more minutes, the reaction emulsion is separated in a separation vessel into aqueous and organic phase, and the organic solvent phase comprising the polycarbonate is washed by known processes, e.g. using centrifugal technology, with dilute mineral acids and then with deionized water until free from electrolyte. The polycarbonate solution can be freed from the solvent by conventional methods. Either by spray-drying methods using methylene chloride as single solvent or, as here, by using concentration-by-evaporation systems to increase the concentration and then removing residual volatiles in a vented extruder. The polycarbonate melt strands discharged therefrom can be converted either by underwater pelletization or strand palletization to the pellet form from which they are thermoplastically processed.

Each of examples 1, 2 and 3 is a different batch of the same polycarbonate.

Example 4 (According to the Invention)

(Production of a Copolycarbonate Having 67% by Weight of BP-TMC and 33% by Weight of BPA)

The plant configuration used to carry out the reaction of the bisphenols with phosgene is the same as that described in examples 1-3.

The following are fed into a pumped-circulation reactor prior to the pump by way of a T-piece: 10 000 kg/h of an alkaline solution of bisphenol A in dilute sodium hydroxide solution, which comprises 14.9% by weight of BPA having an OH excess of 0.17% by weight, and 20 991 kg/h of an alkaline solution of bisphenol TMC [1,1-bis(4-hydroxyphenyl)-3,3,5-trimethylcyclohexane] in dilute sodium hydroxide solution which comprises 1.43% by weight of BP-TMC having an OH excess of 0.22% by weight. The following are fed by way of a further T-piece: 2077 kg/h of phosgene, dissolved in 31 380 kg/h of solvent, which is composed of 50% by weight of methylene chloride and 50% by weight of monochlorobenzene. In order to maintain alkalinity, 832 kg/h of a 50% strength sodium hydroxide solution are fed at a further downstream T-piece, and the reaction mixture is passed back to the pump by way of the heat exchanger and the holding container, and the abovementioned mass streams are added during this process.

The temperature is 38° C.

A portion of the emulsion which is of the same magnitude as the entirety of the inflowing raw materials is passed prior to the feed points for BPA and phosgene from the holding container to a further pump and pumped through a tubular reactor. 531 kg/h of a 50% strength sodium hydroxide solution, and also 61.0 kg/h of a melt of pure phenol are added as chain terminators to the said stream. After a residence time of about 10 minutes, 651 kg/h of a 1% strength by weight solution of N-ethylpiperidine in a solvent mixture (50 parts by weight of methylene chloride and 50 parts by weight of monochlorobenzene) are added and the emulsion is pumped through a former tubular reactor by means of a further pump.

After a residence time of 10 more minutes the reaction emulsion is separated in a separator vessel into aqueous and organic phase, and the organic phase comprising the polycarbonate is subjected to further work-up as described in examples 1-3.

Comparative Examples 5-7

(Production of BPA Copolycarbonates Having 42% by Weight of BP-TMC Having 1.58 Ppm Sulphur Content)

These copolycarbonates are produced in the same way as described in examples 1-3, with the quantities of the streams of BPA and BP-TMC appropriately adapted.

Each of comparative examples 5, 6 and 7 is a different batch of the same polycarbonate.

Comparative Examples 8-10

(Production of BPA Copolycarbonates Having 41% by Weight of BP-TMC Having 2.00 Ppm Sulphur Content)

These copolycarbonates are produced in the same way as described in examples 1-3, with the quantities of the streams of BPA and BP-TMC appropriately adapted.

Each of comparative examples 8, 9 and 10 is a different batch of the same polycarbonate.

Table 1 comprises the results of measurements to determine Y.I., and also constitution and sulphur content for all of the examples:

TABLE 1

Copolycarbonates made of BP-TMC and BPA

| | Example | | | | | | | | | |
|---|---|---|---|---|---|---|---|---|---|---|
| | 1 | 2 | 3 | 4 | 5* | 6* | 7* | 8* | 9* | 10* |
| Proportion of BP-TMC [%] | 44 | 44 | 44 | 67 | 42 | 42 | 42 | 41 | 41 | 41 |
| Sulphur content in BP-TMC [ppm] | 0.87 | 0.87 | 0.87 | 0.87 | 1.58 | 1.58 | 1.58 | 2.00 | 2.00 | 2.00 |
| YI, freshly injection-moulded product | 1.28 | 1.28 | 1.40 | 1.34 | 3.50 | 4.00 | 3.40 | 3.70 | 3.70 | 4.40 |
| YI, 250 h at 150° C. | 3.87 | 3.15 | 5.31 | 4.24 | 8.40 | 8.80 | 7.00 | 7.40 | 9.70 | 10.40 |

*: Comparative example

The invention claimed is:

1. A process for producing a polycarbonate composition by an interfacial process or a melt transesterification process using bisphenol TMC and bisphenol A, characterized in that the sulphur content of the bisphenols used to produce the polycarbonate is less than 1.5 ppm;

wherein the polycarbonate composition comprises at least one polycarbonate component comprising structural units of the general formula (I):

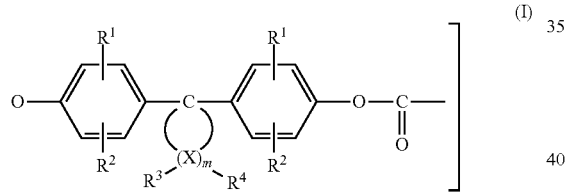

where $R^1$ and $R^2$, independently of one another, are H, halogen, $C_1$-$C_8$-alkyl, $C_5$-$C_6$-cycloalkyl, $C_6$-$C_{10}$-aryl and $C_7$-$C_{12}$-arylalkyl, where m is 4 or 5, where $R_3$ and $R_4$ are freely selectable for each X and, independently of one another, are H or $C_1$-$C_8$-alkyl, where X is carbon, characterized in that the sulphur content in the composition is less than 2.0 ppm;

wherein the at least one polycarbonate component is an aromatic polycarbonate made from 30 to 70 mol % of 3,3,5-trimethyl-1,1-bis(4-hydroxyphenyl)cyclohexane (bisphenol TMC) and 30 to 70 mol % bisphenol A, based on the total amount of bisphenols; and wherein the polycarbonate composition optionally comprises polymer additives or mixture constituents selected from the group of mould-release agents, flow aids, heat stabilizers, antioxidants, UV absorbers and/or IR absorbers, flame retardants, antistatic agents, dyes and pigments, fillers, thermoplastics or elastomers.

2. The process according to claim 1, characterized in that the sulphur content of the bisphenols used for the production process is less than 1.0 ppm.

3. A method for producing transparent or translucent or opaque or coloured mouldings comprising:

mixing bisphenol A and bisphenol TMC and optional polymer additives to form a polycarbonate composition, wherein the sulphur content in the composition is less than 1.5 ppm, and compounding and extruding them in the melt at temperatures of from 240° C. to 300° C.;

wherein the polycarbonate composition comprises at least one polycarbonate component comprising structural units of the general formula (I):

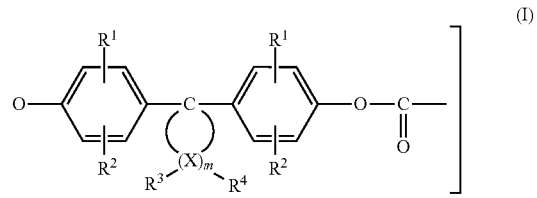

where $R^1$ and $R^2$, independently of one another, are H, halogen, $C_1$-$C_8$-alkyl, $C_5$-$C_6$-cycloalkyl, $C_6$-$C_{10}$-aryl and $C_7$-$C_{12}$-arylalkyl, where m is 4 or 5, where $R_3$ and $R_4$ are freely selectable for each X and, independently of one another, are H or $C_1$-$C_8$-alkyl, where X is carbon, characterized in that the sulphur content in the composition is less than 2.0 ppm;

wherein the at least one polycarbonate component is an aromatic polycarbonate made from 30 to 70 mol % of 3,3,5-trimethyl-1,1-bis(4-hydroxyphenyl)cyclohexane (bisphenol TMC) and 30 to 70 mol % bisphenol A, based on the total amount of bisphenols; and wherein the polycarbonate composition optionally comprises polymer additives or mixture constituents selected from the group of mould-release agents, flow aids, heat stabilizers, antioxidants, UV absorbers and/or IR absorbers, flame retardants, antistatic agents, dyes and pigments, fillers, thermoplastics or elastomers.

4. The process according to claim 1, characterized in that the sulphur content of the bisphenols used for the production process is less than 0.87 ppm.

5. The process according to claim 1, wherein the bisphenol TMC is used in an amount of from 44 to 67% by weight and the bisphenol A is used in an amount of from 33 to 56% by weight.

6. The process according to claim 4, wherein the bisphenol TMC is used in an amount of from 44 to 67% by weight and the bisphenol A is used in an amount of from 33 to 56% by weight.

7. The process according to claim 1, wherein the polycarbonate composition has a yellowness index after hot-air aging at 150° C. for a period of 250 hours of less than 7.0.

8. The process according to claim 1, wherein the organic sulphur content of the bisphenols used to produce the polycarbonate is less than 1.5 ppm.

* * * * *